(No Model.)
2 Sheets—Sheet 1.
J. WEBER.
FLOUR DRESSING MACHINE.
No. 253,452.
Patented Feb. 7, 1882.
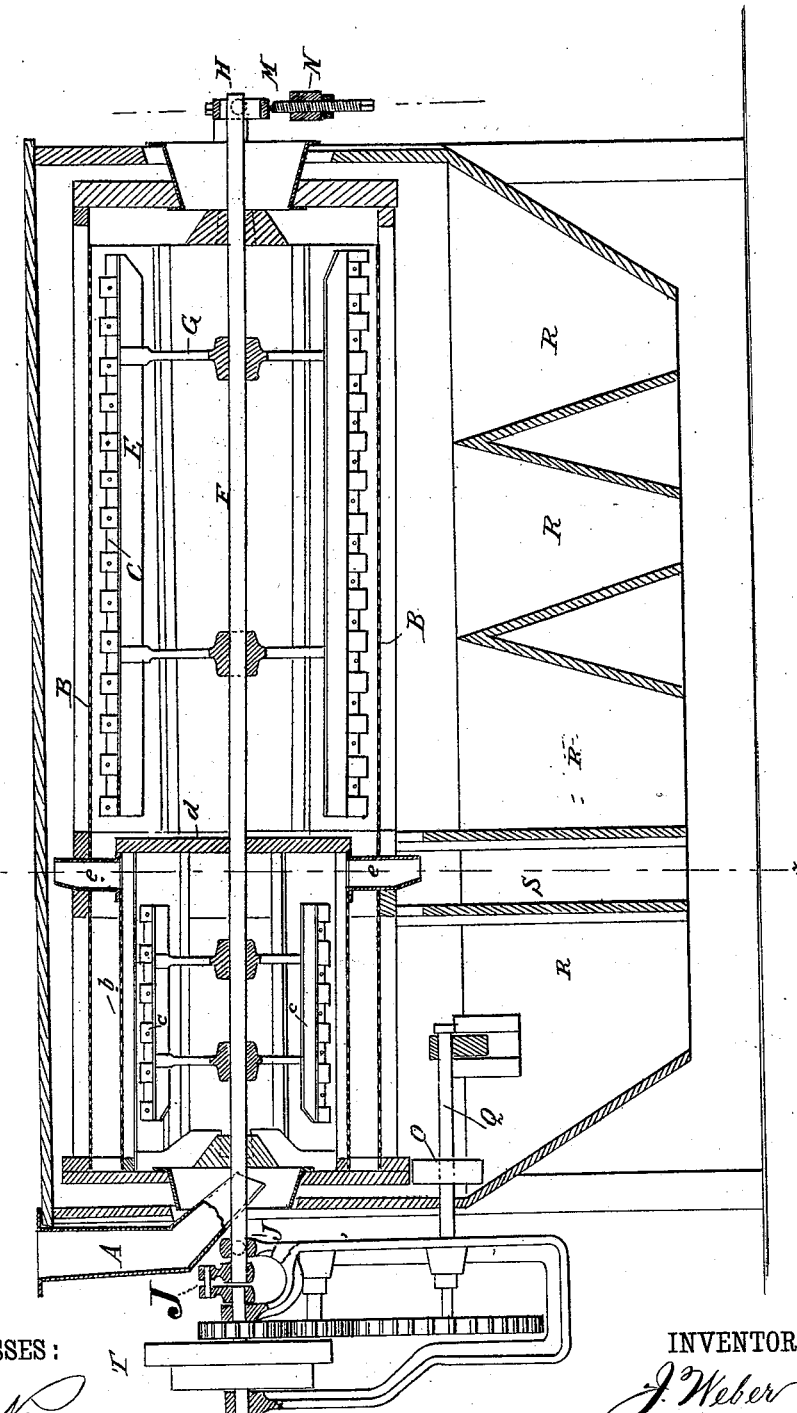
WITNESSES:
INVENTOR:
J. Weber
BY Munn & Co
ATTORNEYS.

(No Model.) 2 Sheets—Sheet 2.
J. WEBER.
FLOUR DRESSING MACHINE.
No. 253,452. Patented Feb. 7, 1882.
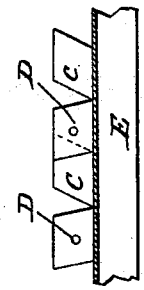
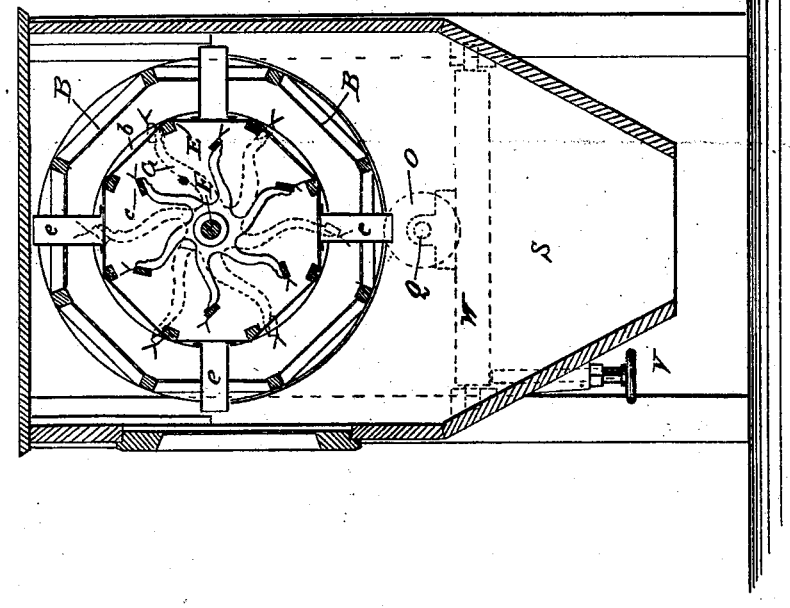
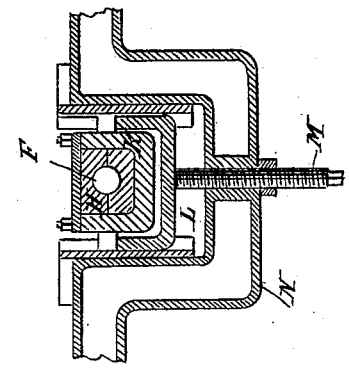
WITNESSES:
Chas. Nida
C. Sedgwick
INVENTOR:
J. Weber
BY Munn & Co
ATTORNEYS.

UNITED STATES PATENT OFFICE.

JOHN WEBER, OF USTER, ZURICH, SWITZERLAND, ASSIGNOR TO JOHN FEICHTER & SONS, OF MINNEAPOLIS, MINNESOTA.

FLOUR-DRESSING MACHINE.

SPECIFICATION forming part of Letters Patent No. 253,452, dated February 7, 1882.

Application filed July 6, 1881. (No model.)

*To all whom it may concern:*

Be it known that I, JOHN WEBER, of Uster, Canton of Zurich, Switzerland, have invented a new and useful Improvement in Flour-Dressing Machines, of which the following is a specification.

Certain parts of the invention described in this application received protection in England under Letters Patent No. 879, dated February 28, 1880, granted to Frank Wirth, of the firm of Wirth & Co., through a communication from Messrs. Weber and Bunzlé, of Uster, Switzerland, and upon the said patented invention the present is designed as an improvement.

The object of my invention is to provide a new and improved machine for separating the flour and grits from the shells, &c., of the grain.

In the accompanying drawings, Figure 1 is a longitudinal sectional elevation of my improved flour-dressing machine. Fig. 2 is a cross-sectional elevation of the same on the line $xx$, Fig. 1. Fig. 3 is a cross-sectional elevation of the same on the line $yy$, Fig. 1. Fig. 4 is a longitudinal elevation of a series of scutchers.

The same letters of reference indicate the same or corresponding parts.

The flour passes from a suitable hopper through the conical chute A into the dressing-cylinder $b$, contained in the cylinder B, the sides of which cylinders are covered with silken gauze stretched thereon. In these dressing-cylinders the flour is exposed to the action of the scutchers C $c$, consisting of short metal strips, which are alternately bent forward and backward, the strips bent forward being provided with one or more apertures, D, as shown in Fig. 4. These strips are attached to rails E, held on a shaft, F, by radial arms G of the same. The shaft F is provided with a joint at J, and its bearing H is pivoted in a vibrating fork, K, which is supported in a sliding and adjustable bearing, L, attached to the upper end of a screw, M, passing through a bent rod or beam, N, by means of which screw M the inclination of the shaft F can be varied at will, all that is necessary being to turn this screw in one direction or the other. A series of hoppers, R R, are arranged below the dressing-cylinder B to receive the dressed flour. The end of the inner cylinder, $b$, is provided with an end wall, $d$, adjoining to which there are a series of short radial tubes or nozzles, $e$, projecting from the cylinder $b$ into a chute, hopper, or box, S, for receiving the shells, &c. The shaft F is rotated by means of a belt passing over the pulleys T T, and the shaft Q is rotated from the shaft F by means of intermediate gearing. A friction-roller, O, is mounted on the shaft Q, and on this roller the end of the cylinder B rests, which is thus rotated very slowly. The bearing of the shaft Q is on a lever, W, which can be adjusted higher or lower by means of a screw, V, whereby the friction between the end of the cylinder B and the friction-wheel O can be increased or decreased.

The operation is as follows: The flour passes through the chute A into the inner cylinder, $b$, and is thrown about in this sieve-cylinder $b$ by the scutchers $c$. The fine flour and grits pass through the sieve into the large cylinder B, and the shells, &c., pass through the radial tubes $e$ $e$ into hopper or chute S. The scutchers C, that are bent forward and perforated, act by their quick rotation to gather the flour or meal against their forward faces, and such of the flour or meal as is forced through the perforations in the scutchers will be disintegrated or separated from any bran or adhering substance by contact with the sharp edges of the holes as the meal passes through the scutchers, while that portion of the flour or meal which passes between the forwardly-bent scutchers will strike against the backwardly-bent scutchers and be violently thrown outward and against the bars and gauze of the cylinder, and will there be disintegrated or separated, the fine flour so separated passing through the gauze, while the bran or shells will pass out as tailings. The same particles of meal may be acted upon many times before complete separation takes place and all the fine flour is forced through the gauze. From the cylinder B the flour drops into the hoppers R, and from these is filled into sacks or barrels.

Having thus fully described my invention, I claim as new and desire to secure by Letters Patent—

1. In a machine for dressing flour, the scutchers C, constructed substantially as herein shown and described, and consisting of a series of metal plates or strips alternately bent forward and backward, the plates bent forward being provided with one or more perforations, as set forth.

2. In a machine for dressing flour, the combination of the adjustable and jointed shaft F, having arms G, carrying scutchers C, that are bent forward and perforated, and scutchers c, that are bent backward and not perforated, cylinder B, clothed with gauze, an inner cylinder, b, within cylinder B, occupying only a part of its length and covered with gauze, radial tubes e e, and chutes S, as and for the purposes described.

In testimony whereof I have signed my name to this specification in the presence of two subscribing witnesses.

JOHN WEBER.

Witnesses:
GUSTAV MANTEL,
M. TAGGS.